(12) United States Patent
Sobue et al.

(10) Patent No.: US 8,042,327 B2
(45) Date of Patent: Oct. 25, 2011

(54) EXHAUST PURIFICATION DEVICE OF INTERNAL COMBUSTION ENGINE

(75) Inventors: Yuichi Sobue, Susono (JP); Hiroyuki Matsubara, Shizuoka (JP); Yusaku Inatomi, Susono (JP); Nagao Toyoshima, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 637 days.

(21) Appl. No.: 12/295,354

(22) PCT Filed: Mar. 22, 2007

(86) PCT No.: PCT/JP2007/056748
§ 371 (c)(1),
(2), (4) Date: Sep. 30, 2008

(87) PCT Pub. No.: WO2007/114201
PCT Pub. Date: Oct. 11, 2007

(65) Prior Publication Data
US 2009/0272100 A1    Nov. 5, 2009

(30) Foreign Application Priority Data

Mar. 31, 2006  (JP) .................................. 2006-098013
Mar. 31, 2006  (JP) .................................. 2006-098119

(51) Int. Cl.
*F01N 3/00*  (2006.01)
*F01N 3/10*  (2006.01)
*F01N 3/02*  (2006.01)

(52) U.S. Cl. ................ 60/297; 60/286; 60/295; 60/301; 60/311

(58) Field of Classification Search .................... 60/281, 60/282, 285, 286, 295, 297, 299, 301, 303, 60/311
See application file for complete search history.

(56) References Cited

FOREIGN PATENT DOCUMENTS

| | | |
|---|---|---|
| EP | 1 625 884 A1 | 2/2006 |
| GB | 1396839 A  * | 10/1975 |
| JP | 4-118021 | 4/1992 |
| JP | 5-212247 | 8/1993 |
| JP | 08-042330 | 2/1996 |
| JP | 8-61045 A | 3/1996 |
| JP | 10-266831 | 10/1998 |
| JP | 2001-73745 A | 3/2001 |
| JP | 2003-301714 A | 10/2003 |
| JP | 2006-9761 A | 1/2006 |

* cited by examiner

*Primary Examiner* — Thomas Denion
*Assistant Examiner* — Audrey Bradley
(74) *Attorney, Agent, or Firm* — Kenyon & Kenyon LLP

(57) ABSTRACT

An engine with an exhaust passage in which a catalyst purifying $NO_x$ and an $NO_x$ adsorbent adsorbing $NO_x$ in an exhaust gas are arranged successively from the upstream side. After engine startup until the catalyst is activated, the $NO_x$ in the exhaust gas is adsorbed at the $NO_x$ adsorbent. $NO_x$ adsorbed at the $NO_x$ adsorbent is removed by dissolution by supplying a solvent from an injector. After the catalyst is activated, the solvent containing the $NO_x$ removed by dissolution is sprayed from an injector and the $NO_x$ contained in the sprayed solvent is purified by the catalyst.

15 Claims, 3 Drawing Sheets

EXHAUST PURIFICATION DEVICE OF INTERNAL COMBUSTION ENGINE

This is a 371 national phase application of PCT/JP2007/056748 filed 22 Mar. 2007, claiming priority to Japanese Patent Applications No. JP 2006-098013, and No. JP 2006-098119, both filed 31 Mar. 2006, the contents of which are incorporated herein by reference.

TECHNICAL FIELD

The present invention relates to an exhaust purification device of an internal combustion engine.

BACKGROUND ART

Known in the art is an exhaust gas purification device designed to remove the $NO_x$ by spraying exhaust gas discharged from the engine into a bubbling tank filled with water to dissolve the $NO_x$ in the water in the bubbling tank, supplying the water dissolving the $NO_x$ into a neutralizing tank provided with a large number of electrode plates to convert the $NO_x$ contained in the water to a soluble substance by electrolytic action, and discharging the water (see Japanese Patent Publication (A) No. 2003-301714).

However, in the above mentioned exhaust gas purification device, the electrode plates are consumables. Accordingly, there is a problem in that the electrode plates must be replaced often.

DISCLOSURE OF THE INVENTION

An object of the present invention is to provide an exhaust purification device of an internal combustion engine capable of removing $NO_x$ in the exhaust gas from the time of engine startup without using consumables requiring frequent replacement.

According to the present invention, there is provided an exhaust purification device of an internal combustion engine, wherein a catalyst able to purify $NO_x$ is arranged in an engine exhaust passage, an $NO_x$ adsorbent adsorbing $NO_x$ in exhaust gas is arranged in the engine exhaust passage downstream of the catalyst, an $NO_x$ removal solvent supply device supplying an $NO_x$ removal solvent for removing by dissolution $NO_x$ adsorbed by the $NO_x$ adsorbent is provided, an $NO_x$-containing solvent supply device supplying an $NO_x$-containing solvent containing the $NO_x$ removed by dissolution from the $NO_x$ adsorbent into the engine exhaust passage upstream of the catalyst is provided, $NO_x$ discharged from the engine is adsorbed by the $NO_x$ adsorbent after the engine starts up until the catalyst is activated, the $NO_x$-containing solvent is supplied from the $NO_x$-containing solvent supply device into the engine exhaust passage when the catalyst is activated, and $NO_x$ in the $NO_x$-containing solvent supplied at this time is purified in the catalyst.

BEST MODE FOR CARRYING OUT THE INVENTION

Figure 1:
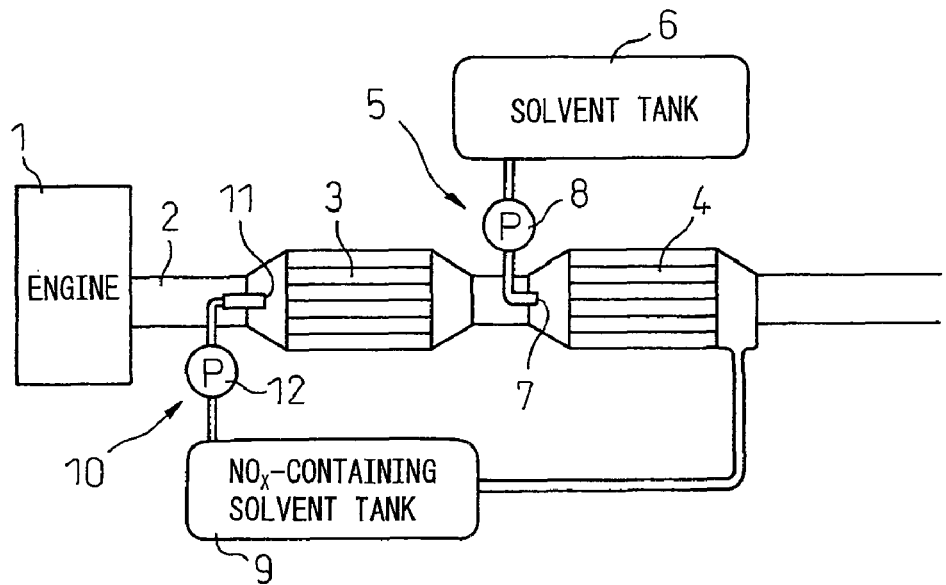
FIG. 1 is an overall view of an exhaust purification device.

Referring to FIG. 1, 1 indicates a gasoline engine or diesel engine, 2 indicates an exhaust passage of the engine 1, and 3 indicates a catalyst 3 able to purify the $NO_x$ and arranged in the exhaust passage 2. As the catalyst 3, any of a three-way catalyst, an $NO_x$ purification catalyst purifying $NO_x$ in the exhaust gas in the presence of a hydrocarbon, or an $NO_x$ storage-reduction type three-way catalyst absorbing $NO_x$ in the exhaust gas may be used.

In the exhaust passage 2 downstream of the catalyst 3, an $NO_x$ adsorbent 4 for adsorbing the $NO_x$ in the exhaust gas is arranged. In an embodiment of the present invention, the $NO_x$ adsorbent 4 comprises one of alumina $Al_2O_3$, ceria $CeO_2$, zirconia $ZrO_2$, titania $TiO_2$, and zeolite. At least one precious metal selected from platinum Pt, palladium Pd, rhodium Rh, and gold Au is carried on the $NO_x$ adsorbent 4.

In the embodiment shown in FIG. 1, an $NO_x$ removal solvent supply device 5 supplying an $NO_x$ removal solvent for dissolving the $NO_x$ adsorbed on the $NO_x$ adsorbent 4 and a solvent tank 6 for storing the $NO_x$ removal solvent are provided. The $NO_x$ removal solvent supply device 5 is provided with an injector 7 for spraying the $NO_x$ removal solvent stored in the solvent tank 6 in the exhaust passage 2 upstream of the $NO_x$ adsorbent 4 and a fuel pump 8 for pumping this $NO_x$ removal solvent to the injector 7. In the embodiment shown in FIG. 1, if the solvent in the solvent tank 6 becomes low, the solvent is supplied in the solvent tank 6 from the outside.

On the other hand, in the embodiment shown in FIG. 1, an $NO_x$-containing solvent tank 9 for storing an $NO_x$-containing solvent containing $NO_x$ removed from the $NO_x$ adsorbent 4 by dissolution and an $NO_x$-containing solvent supply device 10 for supplying this $NO_x$-containing solvent in the exhaust passage 2 upstream of the catalyst 3 are provided. The $NO_x$-containing solvent supply device 10 is provided with an injector 11 for spraying the $NO_x$-containing solvent stored in the $NO_x$-containing solvent tank 9 into the exhaust passage 2 and a feed pump 12 for pumping this $NO_x$-containing solvent to the injector 11.

In an embodiment according to the present invention, at the time of engine startup and in the interval after engine startup to at least when the catalyst 3 is activated, the air-fuel ratio in the combustion chamber of the engine 1 is made the stoichiometric air-fuel ratio or lean. Of course, in this case, the air-fuel ratio in the combustion chamber can be made lean for almost all of the operation period from start of the engine to when the engine is stopped. When the air-fuel ratio in the combustion chamber is made lean, the oxygen becomes in excess, so unburned HC and CO are not generated so much, but a large amount of $NO_x$ is generated. Accordingly, in the period from when the engine operation is started to when the catalyst 3 becomes activated, if the air-fuel ratio in the combustion chamber is made lean, a large amount of $NO_x$ is discharged into the exhaust passage 2. On the other hand, the catalyst 3 does not have the ability to purify $NO_x$ until the catalyst 3 becomes activated. Accordingly, in the period from when the engine operation is started until the catalyst 3 becomes activated, the large amount of $NO_x$ contained in the exhaust gas passes straight through the catalyst 3 without being purified in the catalyst 3.

The same is true when maintaining the air-fuel ratio in the combustion chamber at about the stoichiometric air-fuel ratio. That is, in this case, when the air-fuel ratio in the combustion chamber becomes even slightly lean, a large amount of $NO_x$ is generated. Accordingly, in the period from when the engine operation is started until the catalyst 3 becomes activated, even if the air-fuel ratio in the combustion chamber is maintained at about the stoichiometric air-fuel ratio, a large amount of $NO_x$ is discharged into the exhaust passage 2. At this time, as explained above, the catalyst 3 does not have the ability to purify $NO_x$. Accordingly, in this case as well, in the period from when the engine operation is started until the catalyst 3 becomes activated, the large amount of $NO_x$ contained in the exhaust gas passes straight through the catalyst 3 without being purified in the catalyst 3.

In the present invention, in the period from when the engine operation is started until the catalyst 3 becomes activated, $NO_x$ which passes straight through the catalyst 3, that is, $NO_x$ discharged from the engine 1, is adsorbed on the $NO_x$ adsorbent 4. Accordingly, during that time, the discharge of $NO_x$ into the air is prevented. On the other hand, when the catalyst 3 is activated, the $NO_x$ in the exhaust gas is purified in the catalyst 3. Accordingly, in this case as well, the discharge of $NO_x$ into the air is prevented.

On the other hand, $NO_x$ adsorbed at the $NO_x$ adsorbent 4 is removed by dissolution by supplying the $NO_x$ removal solvent from the injector 7. That is, specifically speaking, in an embodiment according to the present invention, immediately before the engine stops and immediately after the engine stops, the $NO_x$ removal solvent stored in the solvent tank 6 is sprayed from the injector 7 toward the $NO_x$ adsorbent 4. By doing so, the $NO_x$ adsorbed at the $NO_x$ adsorbent 4 is dissolved in the $NO_x$ removal solvent and removed from the $NO_x$ adsorbent 4. The $NO_x$-containing solvent containing $NO_x$ removed from the $NO_x$ adsorbent 4 by dissolution is sent to and stored in the $NO_x$-containing solvent tank 9.

When the engine is operated next and the catalyst 3 is activated, the $NO_x$-containing solvent stored in the $NO_x$-containing solvent tank 9 is supplied from the $NO_x$-containing solvent supply device 10 into the exhaust passage 2. The $NO_x$ in the $NO_x$-containing solvent supplied at this time is purified in the catalyst 3. Specifically, when the catalyst 3 is activated or sometime after the catalyst 3 is activated, the $NO_x$-containing solvent in the $NO_x$-containing solvent tank 9 is sprayed by the feed pump 12 from the injector 11 into the exhaust passage 2 over a predetermined period. While the $NO_x$-containing solvent is being sprayed, the air-fuel ratio in the combustion chamber is made slightly rich. When the air-fuel ratio in the combustion chamber is made rich, a large amount of unburned HC and CO are contained in the exhaust gas. The $NO_x$ in the $NO_x$-containing solvent sprayed from the injector 11 is reduced by these unburned HC and CO in the catalyst 3. That is, the $NO_x$ contained in the spray is purified in the catalyst 3.

Except when the $NO_x$-containing solvent is being sprayed from the injector 11, when the air-fuel ratio in the combustion chamber is made lean even after the catalyst 3 is activated, as the catalyst 3, the aforementioned $NO_x$ purification catalyst purifying the $NO_x$ in the exhaust gas in the presence of a hydrocarbon or the $NO_x$ storage-reduction type three-way catalyst absorbing the $NO_x$ in the exhaust gas are used. Note that this $NO_x$ purification catalyst 3, for example, is comprised of Cu zeolite and performs an $NO_x$ reduction effect under a lean air-fuel ratio of the exhaust gas. On the other hand, the $NO_x$ storage-reduction type three-way catalyst 3, for example, carries an $NO_x$ absorbent comprising an alkali metal or alkali earth metal. When the air-fuel ratio of the exhaust gas flowing into the $NO_x$ storage-reduction type three-way catalyst 3 is lean, the $NO_x$ in the exhaust gas is absorbed by the $NO_x$ absorbent. In this case, when the air-fuel ratio of the exhaust gas flowing into the $NO_x$ storage-reduction type three-way catalyst 3 is made temporarily rich, the $NO_x$ absorbed in the $NO_x$ absorbent is released from the $NO_x$ absorbent and reduced.

On the other hand, except when the $NO_x$-containing solvent is being sprayed from the injector 11, when the air-fuel ratio in the combustion chamber is maintained at about the stoichiometric air-fuel ratio after the catalyst 3 is activated, a three-way catalyst is used as the catalyst 3. When using the three-way catalyst 3 and the air-fuel ratio in the combustion chamber is maintained at substantially the stoichiometric air-fuel ratio, not only is the $NO_x$ in the exhaust gas removed, but also the unburned HC and CO are removed.

Figure 2:
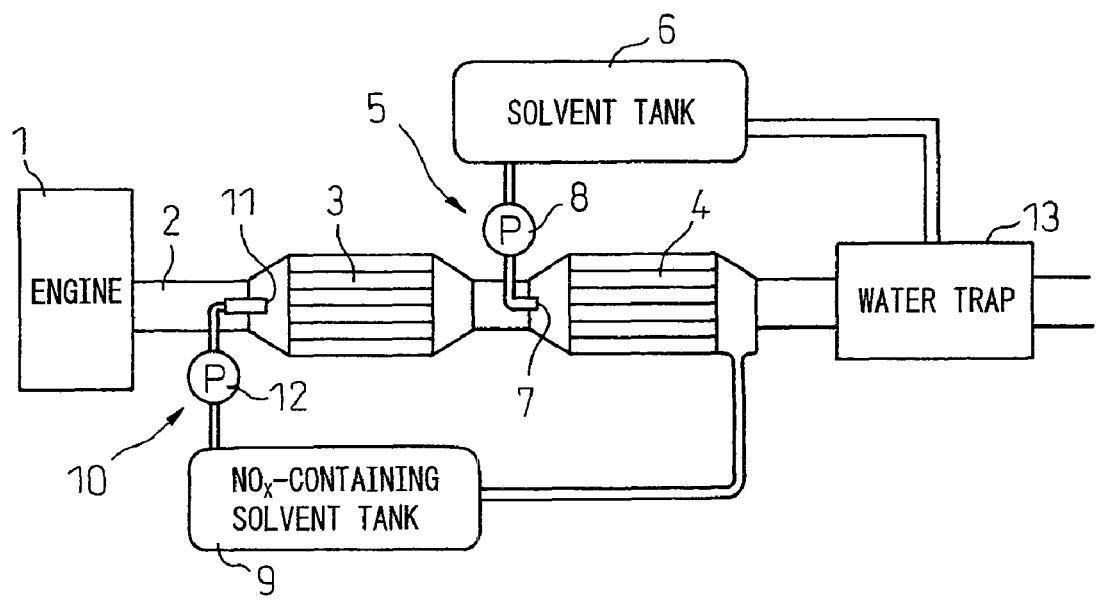
FIG. 2 is an overall view showing another embodiment of an exhaust purification device.

As explained above, in the embodiment shown in FIG. 1, when the solvent in the solvent tank 6 becomes low, the solvent must be refilled. FIG. 2 shows a different embodiment using water as the $NO_x$ removal solvent and therefore not requiring refill of the solvent.

Referring to FIG. 2, in this embodiment, a water trap 13 for trapping moisture contained in the exhaust gas is arranged in the exhaust passage 2 downstream of the $NO_x$ adsorbent 4. Water trapped in the water trap 13 is sent into the solvent tank 6. In this embodiment, when removing $NO_x$ adsorbed from the $NO_x$ adsorbent 4 by dissolution, the water stored in the solvent tank 6, that is, the water trapped in the water trap 13, is used. The water used for removing the $NO_x$ from the $NO_x$ adsorbent 4 by dissolution in this way is trapped from inside the exhaust gas, so water does not have to be particularly refilled from the outside.

Figure 3:
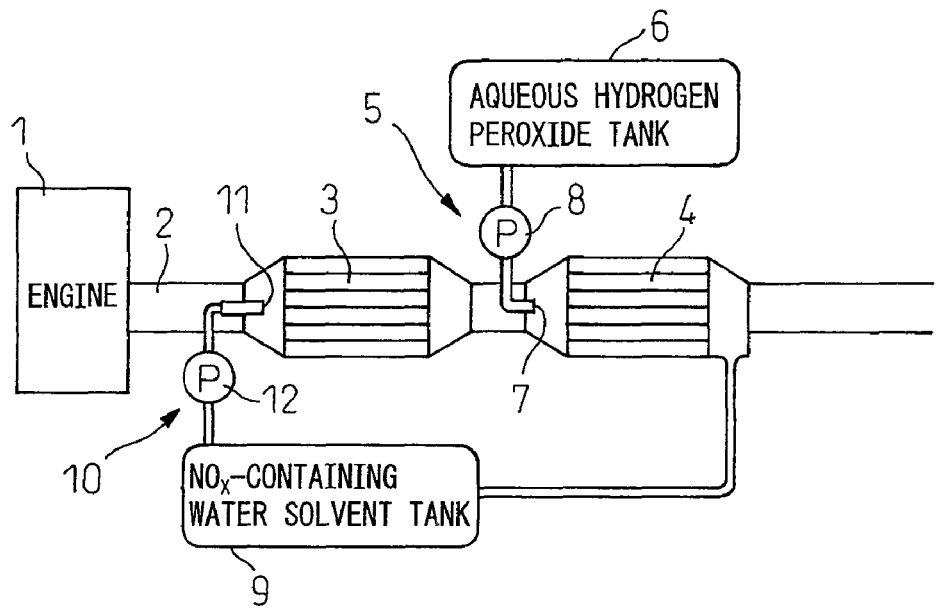
FIG. 3 is an overall view of an exhaust purification device.

FIG. 3 shows a case where aqueous hydrogen peroxide is used as the $NO_x$ removal solvent. In this case, the solvent tank 6 shown in FIG. 1 stores the aqueous hydrogen peroxide inside it, so this solvent tank 6 is called an "aqueous hydrogen peroxide tank 6" in the case shown in FIG. 3. Further, the $NO_x$-containing solvent tank 9 shown in FIG. 1 stores the $NO_x$-containing aqueous solution containing $NO_x$ removed from the $NO_x$ adsorbent 4 by dissolution, so this $NO_x$-containing solvent tank 9 is called an "$NO_x$-containing aqueous solution tank 9" in the case shown in FIG. 3. Note that, in this embodiment as well, in the same way as in the embodiment shown in FIG. 1, when the aqueous hydrogen peroxide in the aqueous hydrogen peroxide tank 6 becomes low, the aqueous hydrogen peroxide is refilled from the outside into the aqueous hydrogen peroxide tank 6.

In this embodiment as well, in the period from when the engine operation is started until the catalyst 3 becomes activated, $NO_x$ which passes through the catalyst 3, that is, $NO_x$ discharged from the engine 1, is adsorbed at the $NO_x$ adsorbent 4. At this time, the $NO_x$ adsorbent 4 adsorbs the majority of the $NO_x$ in the form of $NO_2^-$ and a portion in the form of NO. When the aqueous hydrogen peroxide is supplied to the adsorbed $NO_x$ from the injector 7, the following reaction occurs. As a result, the adsorbed $NO_x$ is dissolved in the water in the form of nitric acid ions $NO_3^-$ and removed from the $NO_x$ adsorbent 4.

$$NO_2^- + H_2O_2 \rightarrow NO_3^- + H_2O$$

$$NO + 2H_2O_2 \rightarrow NO_3^- + 2H_2O$$

Here, the results of an experiment relating to a concentration of aqueous hydrogen peroxide suitable for removing $NO_x$ from the $NO_x$ adsorbent 4 by dissolution will be explained. In this experiment, as the $NO_x$ adsorbent 4, an $NO_x$ adsorbent 4 obtained by first wash-coating alumina $Al_2O_3$ (200 g/l) on a honeycomb structure comprising cordierite, then firing this at 500° C. for 2 hours, then impregnating 2 (g/l) of platinum Pt by using a dinitro diammine Pt nitrate solution (4%), then firing this at 500° C. for 2 hours is used.

Figure 4:
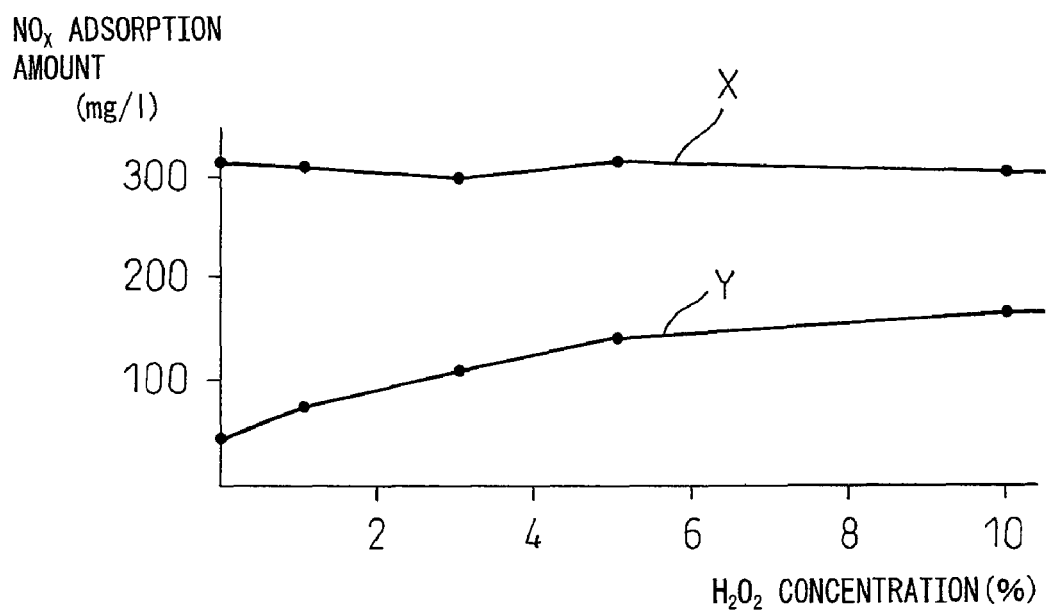
FIG. 4 is a view showing an $NO_x$ adsorption amount.

FIG. 4 shows the results of an experiment of the $NO_x$ adsorption amount when using a 35 cc test piece of the $NO_x$ adsorbent 4. Note that, in FIG. 4, X indicates an $NO_x$ adsorption amount when $NO_x$ is first adsorbed on the test piece, and Y indicates an $NO_x$ adsorption amount after 150 cc of aqueous hydrogen peroxide of the concentration shown in the abssisa is run over the test piece. As shown in Y of FIG. 4, the $NO_x$ adsorption amount after $NO_x$ had been removed by dissolution once from the $NO_x$ adsorbent 4 increases the higher the concentration of aqueous hydrogen peroxide. Accordingly, the higher the concentration of aqueous hydrogen peroxide, the more preferable. However, the aqueous hydrogen peroxide will become a poison when it becomes a concentration of 6% or more, it can be said to be preferable for the concentration of the aqueous hydrogen peroxide to be used to be made as high as possible within 6%.

As explained above, the $NO_x$ adsorbed on the $NO_x$ adsorbent 4 is removed by dissolution by supplying aqueous hydrogen peroxide from the injector 7. That is, specifically speaking, in an embodiment according to the present invention, immediately before the engine is stopped and immediately after the engine is stopped, aqueous hydrogen peroxide stored in the aqueous hydrogen peroxide tank 6 is sprayed from the injector 7 toward the $NO_x$ adsorbent 4. By doing this, the $NO_x$ adsorbed on the $NO_x$ adsorbent 4 dissolves in water in the form of $NO_3^-$ and is removed from the $NO_x$ adsorbent 4. The $NO_x$ removed by dissolution from the $NO_x$ adsorbent 4, that is, the $NO_x$-containing aqueous solution containing $NO_3^-$, is sent to and stored in the $NO_x$-containing aqueous solution tank 9.

When the engine is operated next and the catalyst 3 is activated, the $NO_x$-containing aqueous solution stored in the $NO_x$-containing aqueous solution tank 9 is supplied from the $NO_x$-containing aqueous solution supply device 10 into the exhaust passage 2. The $NO_x$ in the $NO_x$-containing aqueous solution supplied at this time is purified in the catalyst 3. Specifically speaking, when the catalyst 3 is activated or sometime after the catalyst 3 becomes activated, the $NO_x$-containing aqueous solution in the $NO_x$-containing aqueous solution tank 9 is sprayed by the feed pump 12 from the injector 11 into the exhaust passage 2 over a predetermined period. In the period when the $NO_x$-containing solvent is sprayed, the air-fuel ratio in the combustion chamber is made slightly rich. When the air-fuel ratio in the combustion chamber is rich, large amounts of unburned HC and CO are contained in the exhaust gas. The $NO_x$ in the $NO_x$-containing solvent sprayed from the injector 11 is reduced by these unburned HC and CO on the catalyst 3. That is, the $NO_x$ contained in the spray is purified in the catalyst 3.

Figure 5:
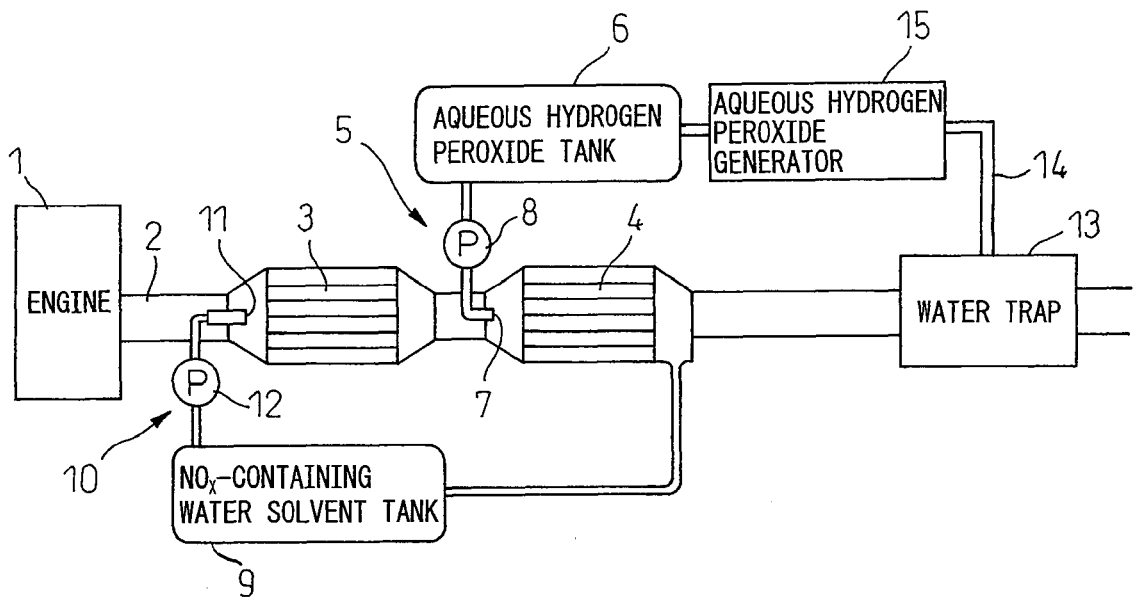
FIG. 5 is an overall view showing another embodiment of an exhaust purification device.
Figure 6:
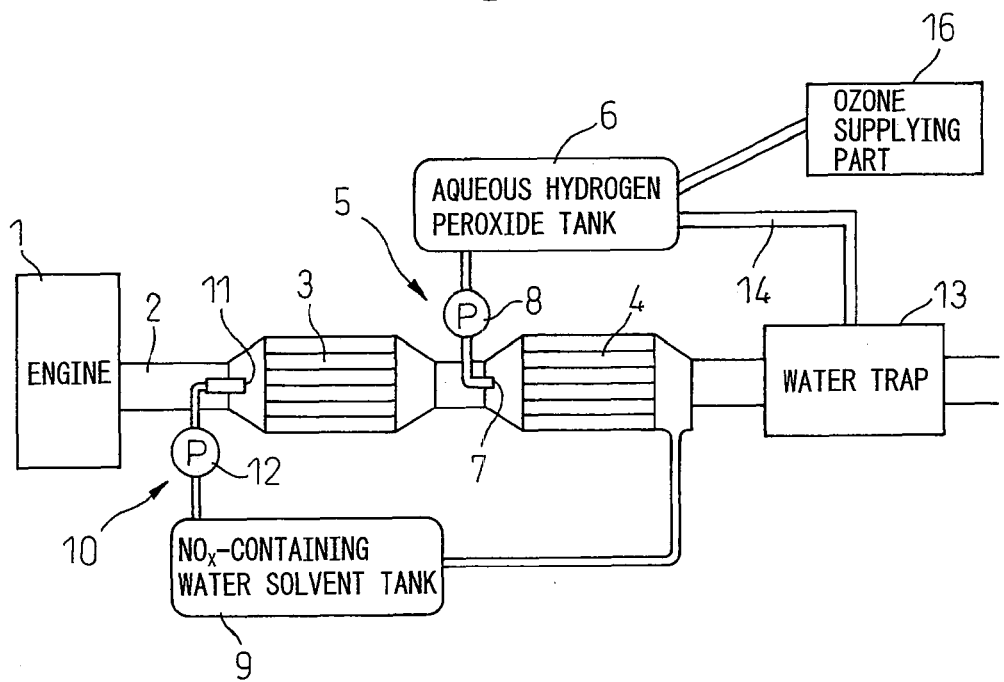
FIG. 6 is an overall view showing still another embodiment of an exhaust purification device.

As explained above, in the embodiment shown in FIG. 3, when the aqueous hydrogen peroxide in the aqueous hydrogen peroxide tank 6 becomes low, the aqueous hydrogen peroxide must be refilled. FIG. 5 and FIG. 6 respectively show different embodiments not requiring refilling aqueous hydrogen peroxide.

Referring to FIG. 5, in this embodiment, a water trap 13 for trapping moisture contained in the exhaust gas is arranged in the exhaust passage 2 downstream of the $NO_x$ adsorbent 4. Aqueous hydrogen peroxide is produced using water trapped in the water trap 13. Specifically speaking, in the embodiment shown in FIG. 5, in the water guide passage 14 connecting the water trap 13 and the aqueous hydrogen peroxide tank 6, an aqueous hydrogen peroxide generator 15 for converting water trapped in the water trap 13 to aqueous hydrogen peroxide is provided. The aqueous hydrogen peroxide produced in the aqueous hydrogen peroxide generator 15 is supplied into the aqueous hydrogen peroxide tank 6. Accordingly, in this embodiment, it is not necessary in particular to refill the aqueous hydrogen peroxide from the outside.

The aqueous hydrogen peroxide generator shown in FIG. 5 comes in various types. Giving one example, an aqueous hydrogen peroxide generator provided with an anode and cathode arranged facing each other in the water and electrolytically reducing the oxygen at the cathode so as to produce aqueous hydrogen peroxide may be used.

On the other hand, in the embodiment shown in FIG. 6, the water trapped in the water trap 13 is supplied through the water guide passage 14 into the aqueous hydrogen peroxide tank 6, and an ozone feed part 16 for supplying ozone into the aqueous hydrogen peroxide tank 6 is provided. When ozone is supplied into the aqueous hydrogen peroxide, water is changed into aqueous hydrogen peroxide and the aqueous hydrogen peroxide is made to contain ozone. When ozone is contained in the water, the degree of solubility of the $NO_x$ in water increases, therefore the $NO_x$ adsorbed at the $NO_x$ adsorbent 4 may be dissolved further easily.

In the ozone feed part 16, for example, an ozonator is used to generate ozone from the oxygen in the air. Accordingly, in the embodiment shown in FIG. 6, it is not necessary to refill aqueous hydrogen peroxide and ozone from the outside.

Note that, an aqueous solution of sodium hydroxide or an alkaline aqueous solution such as ammonia water may be used as an $NO_x$ removal solvent.

LIST OF REFERENCE NUMERALS

1 . . . engine
2 . . . exhaust passage
3 . . . catalyst
4 . . . $NO_x$ adsorbent
5 . . . $NO_x$ removal solvent supply device, aqueous hydrogen peroxide supply device
6 . . . solvent tank, aqueous hydrogen peroxide tank
7, 11 . . . injector
8, 12 . . . fuel pump
9 . . . $NO_x$-containing solvent tank, $NO_x$-containing aqueous solution tank
10 . . . $NO_x$-containing solvent supply device, $NO_x$-containing aqueous solution supply device

The invention claimed is:

1. An exhaust purification device of an internal combustion engine, wherein a catalyst able to purify $NO_x$ is arranged in an engine exhaust passage, an $NO_x$ adsorbent adsorbing $NO_x$ in exhaust gas is arranged in the engine exhaust passage downstream of the catalyst, an $NO_x$ removal solvent supply device supplying an $NO_x$ removal solvent for removing by dissolution $NO_x$ adsorbed by the $NO_x$ adsorbent is provided, an $NO_x$-containing solvent supply device supplying an $NO_x$-containing solvent containing the $NO_x$ removed by dissolution from the $NO_x$ adsorbent into the engine exhaust passage upstream of said catalyst is provided, $NO_x$ discharged from the engine is adsorbed by said $NO_x$ adsorbent after the engine starts up until said catalyst is activated, the $NO_x$-containing solvent is supplied from the $NO_x$-containing solvent supply device into the engine exhaust passage when said catalyst is activated, and $NO_x$ in the $NO_x$-containing solvent supplied at this time is purified in said catalyst.

2. An exhaust purification device of an internal combustion engine as claimed in claim 1, wherein when $NO_x$-containing solvent is supplied into the engine exhaust passage, an air-fuel ratio is made rich.

3. An exhaust purification device of an internal combustion engine as claimed in claim 1, wherein an air-fuel ratio is made the stoichiometric air-fuel ratio or lean in the interval after engine startup to at least when said catalyst is activated.

4. An exhaust purification device of an internal combustion engine as claimed in claim 1, wherein immediately before the engine is stopped or immediately after the engine is stopped, the $NO_x$ removal solvent is supplied to the $NO_x$ adsorbent.

5. An exhaust purification device of an internal combustion engine as claimed in claim 1, wherein said catalyst comprises a three-way catalyst, an $NO_x$ purification catalyst purifying $NO_x$ in the exhaust gas in the presence of hydrocarbons, or an $NO_x$ storage-reduction type three-way catalyst absorbing $NO_x$ in the exhaust gas.

6. An exhaust purification device of an internal combustion engine as claimed in claim 1, wherein said $NO_x$ adsorbent comprises one of alumina, ceria, zirconia, titania, and zeolite, and one precious metal selected from platinum, palladium, rhodium, and gold is carried on the $NO_x$ adsorbent.

7. An exhaust purification device of an internal combustion engine as claimed in claim 1, wherein an $NO_x$-containing solvent tank for storing an $NO_x$-containing solvent is provided and said $NO_x$-containing solvent supply device is provided with an injector for spraying the $NO_x$-containing solvent stored in the $NO_x$-containing solvent tank into the engine exhaust passage.

8. An exhaust purification device of an internal combustion engine as claimed in claim 1, wherein a solvent tank for storing the $NO_x$ removal solvent is provided, and said $NO_x$ removal solvent supply device is provided with an injector for spraying the $NO_x$ removal solvent stored in the solvent tank in the engine exhaust passage upstream of the $NO_x$ adsorbent.

9. An exhaust purification device of an internal combustion engine as claimed in claim 1, wherein said $NO_x$ removal solvent is comprised of water.

10. An exhaust purification device of an internal combustion engine as claimed in claim 9, wherein a water trap for trapping moisture contained in the exhaust gas is arranged in the engine exhaust passage downstream of said $NO_x$ adsorbent, and water trapped in said water trap is used as said $NO_x$ removal solvent.

11. An exhaust purification device of an internal combustion engine as claimed in claim 1, wherein said $NO_x$ removal solvent is comprised of aqueous hydrogen peroxide.

12. An exhaust purification device of an internal combustion engine as claimed in claim 11, wherein a water trap for trapping moisture contained in the exhaust gas is arranged in the engine exhaust passage downstream of said $NO_x$ adsorbent, and aqueous hydrogen peroxide is produced by using water trapped in said water trap.

13. An exhaust purification device of an internal combustion engine as claimed in claim 12, wherein an aqueous hydrogen peroxide generator for converting water trapped in said water trap into aqueous hydrogen peroxide is provided, the aqueous hydrogen peroxide produced in the aqueous hydrogen peroxide generator is supplied into an aqueous hydrogen peroxide tank, and the aqueous hydrogen peroxide stored in the aqueous hydrogen peroxide tank is used as the $NO_x$ removal solvent.

14. An exhaust purification device of an internal combustion engine as claimed in claim 12, wherein water trapped in said water trap is supplied into said aqueous hydrogen peroxide tank, and said aqueous hydrogen peroxide tank is supplied with ozone to convert the water to aqueous hydrogen peroxide and make the aqueous hydrogen peroxide in the aqueous hydrogen peroxide tank contain ozone.

15. An exhaust purification device of an internal combustion engine as claimed in claim 14, wherein said ozone is generated using oxygen in the air.

\* \* \* \* \*

UNITED STATES PATENT AND TRADEMARK OFFICE
CERTIFICATE OF CORRECTION

PATENT NO.         : 8,042,327 B2
APPLICATION NO.    : 12/295354
DATED              : October 25, 2011
INVENTOR(S)        : Yuichi Sobue et al.

It is certified that error appears in the above-identified patent and that said Letters Patent is hereby corrected as shown below:

In the Title Page Item [75]:  Replace the inventors' information with the following, wherein the city of residence of the second listed inventor has been corrected:

-- (75) Inventors:    Yuichi Sobue, Susono (JP);

Hiroyuki Matsubara, Suntougun (JP);

Yusaku Inatomi, Susono (JP);

Nagao Toyoshima, Susono (JP) --

Signed and Sealed this
Fifteenth Day of May, 2012

David J. Kappos
*Director of the United States Patent and Trademark Office*